US012748319B1

(12) United States Patent
Wang

(10) Patent No.: US 12,748,319 B1
(45) Date of Patent: Sep. 29, 2026

(54) EYEGLASS NOSE PAD AND AI EYEGLASS

(71) Applicant: Jianying Wang, Shenzhen (CN)

(72) Inventor: Jianying Wang, Shenzhen (CN)

( * ) Notice: Subject to any disclaimer, the term of this patent is extended or adjusted under 35 U.S.C. 154(b) by 0 days.

(21) Appl. No.: 19/432,207

(22) Filed: Dec. 24, 2025

(51) Int. Cl.
*G02C 5/12* (2006.01)
*G02B 27/01* (2006.01)

(52) U.S. Cl.
CPC ........... *G02C 5/12* (2013.01); *G02B 27/0176* (2013.01); *G02B 2027/0178* (2013.01)

(58) Field of Classification Search
CPC .......... G02C 5/04; G02C 5/02; G02C 5/2209; G02C 5/22; G02C 5/124; G02C 5/122; G02C 5/12; G02B 27/0176; G02B 2027/0178
See application file for complete search history.

(56) References Cited

U.S. PATENT DOCUMENTS 899,409 A * 9/1908 Kampfe .................. G02C 5/02 351/131
1,978,276 A * 10/1934 Nelson .................. G02C 5/124 351/137
2,350,386 A * 6/1944 Christman ............ G02C 5/124 351/110
2,986,971 A * 6/1961 Jent ........................ G02C 5/124 351/137
3,233,956 A * 2/1966 De Angelis ........... G02C 5/122 351/137
4,822,158 A * 4/1989 Porsche .................. G02C 1/04 351/124
5,971,538 A * 10/1999 Heffner .................. G02C 5/122 351/137
6,520,636 B2 * 2/2003 Saitoh .................... G02C 5/126 351/137
11,095,873 B2 * 8/2021 Kuronuma ............ G02C 5/122
2012/0081654 A1 * 4/2012 Kim ........................ G02C 5/122 351/137
2016/0320639 A1 * 11/2016 Miller ..................... G02C 9/04
2021/0215950 A1 * 7/2021 Ricks ...................... G02C 11/10

FOREIGN PATENT DOCUMENTS

CN 208537842 U 2/2019
CN 111722414 A 9/2020
CN 221686746 U 9/2024

* cited by examiner

*Primary Examiner* — Travis S Fissel
(74) *Attorney, Agent, or Firm* — Nitin Kaushik

(57) ABSTRACT

Provided are an eyeglass nose pad and an AI eyeglass. The eyeglass nose pad includes a connector and a bracket; the bracket is formed by integrally bending a metal wire, and includes a horizontal rotating shaft, connecting arms bent and extended inward a rotating plane from both ends of the rotating shaft, and mounting arms extended obliquely upward from the end of each of the connecting arms. By the cooperation between the detachable connector and the integrally formed bracket, the mounting arms extend obliquely upward, shortening the nose pad-nose bridge distance for different users and ensuring better fit. Pressing the mounting arms to adjust the bracket angle allows convenient storage in an eyeglass case. Moreover, the entire nose pad assembly can be conveniently detached from the eyeglass body via snap-fit structures, and the worn nose pad members or bracket can be replaced independently, improving hygiene and reducing maintenance costs.

9 Claims, 6 Drawing Sheets

EYEGLASS NOSE PAD AND AI EYEGLASS

TECHNICAL FIELD

The present disclosure relates to an eyeglass nose pad and an electronic eyeglass, belonging to the technical field of intelligent device accessories.

BACKGROUND

With the development of intelligent wearable device technology, electronic eyeglasses integrated with display modules, cameras, sensors, batteries, and processing circuits have become important personal computing and interaction platforms. Compared with traditional optical eyeglasses, such intelligent eyeglasses integrate a large number of electronic components inside, resulting in a significant increase in their overall volume and weight, which puts forward higher requirements for wearing comfort and stability.

As the main components that directly contact the user's nose bridge and bear the load of the eyeglasses, the nose pads are of vital importance in design. Currently, to simplify the structure, ensure circuit layout, or for cost considerations, many electronic eyeglasses on the market usually adopt a fixed design where the nose pads are integrally injection-moulded with the frames. This fixed nose pad design has drawbacks: the bridge curve of the nose varies from user to user, making it difficult for the fixed nose pads to fit well with the nasal bridges of different users; and due to the integration of electronic components in electronic eyeglasses, they are bulkier and heavier than ordinary eyeglasses, and ill-fitting nose pads cannot provide sufficient friction and wrapping during wear, which causes the eyeglasses to easily slide or slip down the nose bridge, affecting wearing stability. Moreover, although a small number of electronic eyeglasses are equipped with independent nose pad parts, these parts protrude beyond the main frame body, which increases the overall contour size and storage volume of the eyeglasses. As the matching eyeglass cases usually have a charging function, placing such eyeglasses into a universal eyeglass case designed for first-generation or standard models may affect their charging effect, while redesigning and matching special eyeglass cases for them will incur additional costs. Furthermore, the nose pad area is prone to sweat and dirt buildup, which is likely to cause corrosion to the nose pad part of the electronic eyeglasses. When the nose pads are worn or damaged, they cannot be replaced independently, leading to high maintenance costs. Therefore, the present disclosure provides an eyeglass nose pad and an electronic eyeglass.

SUMMARY

In view of the foregoing, the present disclosure provides an eyeglass nose pad and an electronic eyeglass, which solve or alleviate the technical problems existing in the prior art, and at least provide a beneficial alternative.

The technical solution of the present disclosure is achieved as follows: An eyeglass nose pad, comprising a connector and a bracket;

the bracket is formed by integrally bending a metal wire, and comprises a horizontal rotating shaft, connecting arms bent and extended at a 90-degree angle from both ends of the rotating shaft, and mounting arms extended obliquely upward from the end of each of the connecting arms; the rotating shaft is rotatably connected to the connector, and nose pad members are mounted at the ends of the mounting arms.

Further preferably, the bracket has a rotational stroke of 0 to 180 degrees relative to the connector, and the connector is provided with a limiting structure for locking and positioning the connecting arms when the bracket rotates to one end of the stroke.

Further preferably, the limiting structure comprises a pair of locking plates symmetrically fixed to both sides of the bottom of the connector, and locking blocks are fixedly connected to the mutually facing sides of the two locking plates; when the bracket rotates to the position of 0 degrees or 180 degrees, the connecting arms are constrained between the locking blocks and the body of the connector.

Further preferably, accommodating slots are provided in regions of the connector corresponding to the positions where the connecting arms are in a locked state.

Further preferably, supporting blocks are symmetrically and fixedly connected to both sides of the connector; arc-shaped rotating slots are provided on the supporting blocks; a limiting baffle is fixedly connected to the connector between the two supporting blocks; the upper edge of the limiting baffle is flush with the tangent line at the lowest point of the bottom of the rotating slots; and the rotating shaft of the bracket is accommodated in the two rotating slots.

Further preferably, a cladding plate bent and extended toward the rotating shaft is fixedly connected to the top of the connector adjacent to the limiting baffle, and the bent portion of the cladding plate semi-clads the upper part of the rotating shaft.

Further preferably, a guiding gap is formed between the cladding plate and the limiting baffle, with the width of the guiding gap being smaller than that of the rotating slots, and a through slot is provided on the side of the connector corresponding to the guiding gap facing the interior thereof.

Further preferably, reinforcing ribs are provided on the sides of the two locking plates facing away from each other.

An electronic eyeglass nose pad, it comprises the eyeglass nose pad in the above embodiment, and it is configured to be detachably mounted on an electronic eyeglass body, wherein a beam part and a nose pad part are disposed on the electronic eyeglass body, wherein the connector is configured to have snap-fit structures disposed on the top and bottom thereof, so that the connector is snap-fitted on the electronic eyeglass body between the beam part and the nose pad part without additional connection mechanism. An electronic eyeglass, comprises the electronic eyeglass nose pad in the above embodiment.

Further preferably, the snap-fit structures comprise upper snap-fit portions symmetrically disposed on both sides of the top of the connector for snap-fitting with the beam part, and lower snap-fit portions symmetrically disposed on both sides of the connector for being snap-fitted into the gap between the nose pad part and the beam part.

By means of the foregoing technical solution, the embodiments of the present disclosure have the following advantages:

By the cooperation between the detachable connector and the integrally formed bracket, the mounting arms of the bracket extend obliquely upward, shortening the nose pad-nose bridge distance for different users and ensuring better fit, thereby improving the stability during long-term wearing. Pressing the mounting arms of the bracket to adjust the bracket angle allows convenient storage in an eyeglass case. Moreover, the entire nose pad assembly can be conveniently detached from the eyeglass body via snap-fit structures, which allows users to thoroughly clean and disinfect the nose pads, and the worn nose pad members or bracket can be replaced independently, improving hygiene and reducing maintenance costs.

The foregoing summary is provided solely for the purpose of the specification and is not intended to be limiting in any way. In addition to the illustrative aspects, embodiments, and features described above, further aspects, embodiments, and features of the present disclosure will become apparent with reference to the accompanying drawings and the following detailed description.

BRIEF DESCRIPTION OF DRAWINGS

To more clearly illustrate the technical solutions in the embodiments of the present application or in the prior art, the accompanying drawings required for describing the embodiments or the prior art will be briefly introduced below. Obviously, the accompanying drawings in the following description are merely some embodiments of the present application, and for those of ordinary skill in the art, other accompanying drawings can also be obtained based on these drawings without making creative efforts.

REFERENCE NUMERALS

Figure 1:
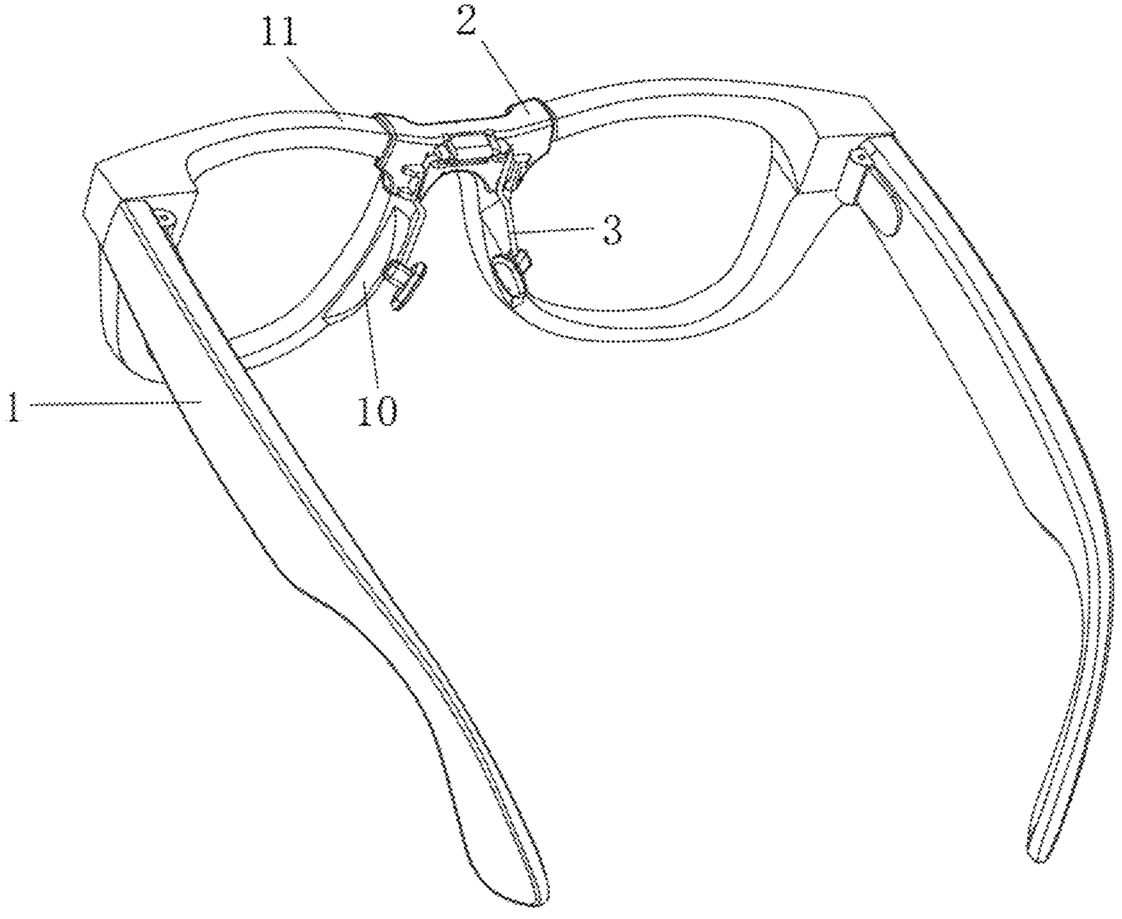
FIG. 1 is a structural diagram of the present disclosure.

1—electronic eyeglass body; 10—nose pad part; 11—beam part; 2—connector; 20—supporting block; 21—limiting baffle; 22—cladding plate; 23—locking plate; 24—rotating slot; 25—guiding gap; 26—locking block; 27—reinforcing rib; 28—accommodating slot; 29—lower snap-fit portion; 201—upper snap-fit portion; 202—through slot; 3—bracket; 30—rotating shaft; 31—connecting arm; 32—mounting arm; 33—nose pad member.

DETAILED DESCRIPTION OF THE EMBODIMENTS

To make the objectives, technical solutions, and advantages of the present disclosure clearer, the present disclosure is described in further detail below with reference to the accompanying drawings and embodiments. However, it should be understood that the specific embodiments described herein are merely intended to illustrate the present disclosure and are not intended to limit the scope of the present disclosure. In addition, descriptions of well-known structures and technologies are omitted in the following description to avoid unnecessarily obscuring the concepts of the present disclosure.

In the description of the present disclosure, it should be noted that when an element is referred to as being "fixed to" or "disposed on" another element, it may be directly on another element or indirectly on another element. When an element is referred to as being "connected to" another element, it may be directly connected to another element or indirectly connected to another element.

In the description of the present disclosure, it should be noted that the orientations or positional relationships indicated by the terms such as "center", "length", "width", "thickness", "upper", "lower", "front", "rear", "left", "right", "vertical", "horizontal", "top", "bottom", "inner", and "outer" are based on the orientations or positional relationships shown in the accompanying drawings, or the customary orientations or positional relationships when the product of the present disclosure is in use. These terms are used merely for convenience in describing the present disclosure and simplifying the description, rather than indicating or implying that the referred device or element must have a specific orientation or be constructed and operated in a specific orientation, and thus shall not be construed as limiting the present disclosure. In addition, the terms such as "first", "second", and "third" are used merely for the purpose of distinguishing between descriptions, and shall not be construed as indicating or implying relative importance. Thus, features defined with "first" and "second" may explicitly or implicitly include one or more such features. In the description of the present disclosure, "a plurality of" means two or more, unless otherwise explicitly and specifically defined. "Several" means one or more, unless otherwise explicitly and specifically defined.

In the description of the present disclosure, it should also be noted that, unless otherwise explicitly specified and defined, the terms "disposed", "mounted", "joined", and "connected" shall be interpreted in a broad sense. For example, they may refer to a fixed connection, a detachable connection, or an integral connection; a mechanical connection or an electrical connection; a direct connection, an indirect connection via an intermediate medium, or internal communication between two elements. For those of ordinary skill in the art, the specific meanings of the above terms in the present disclosure may be understood based on the specific circumstances.

The embodiments of the present disclosure are described in detail below with reference to the accompanying drawings.

Figure 2:
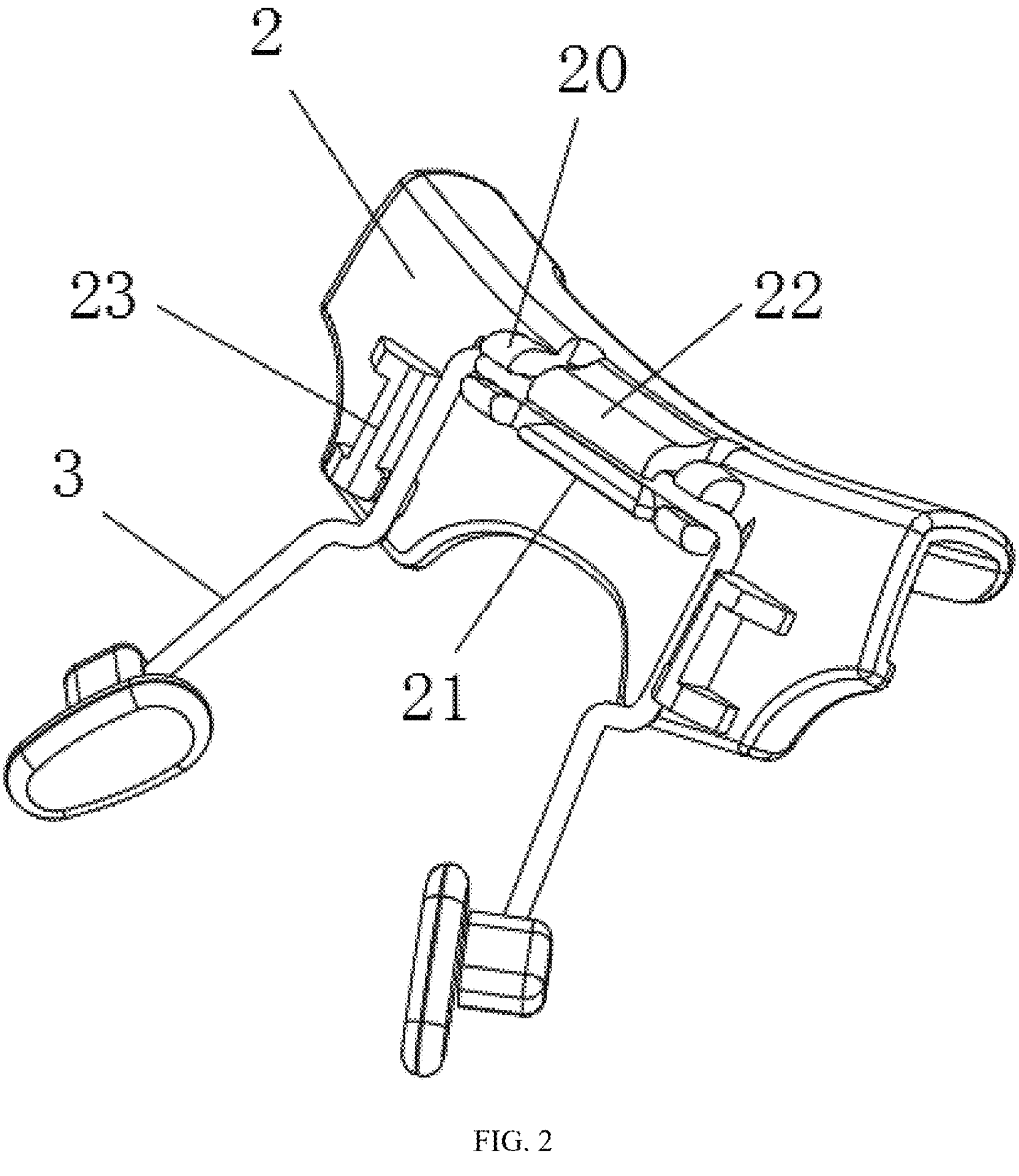
FIG. 2 is a structural diagram of the connector and bracket of the present disclosure.
Figure 3:
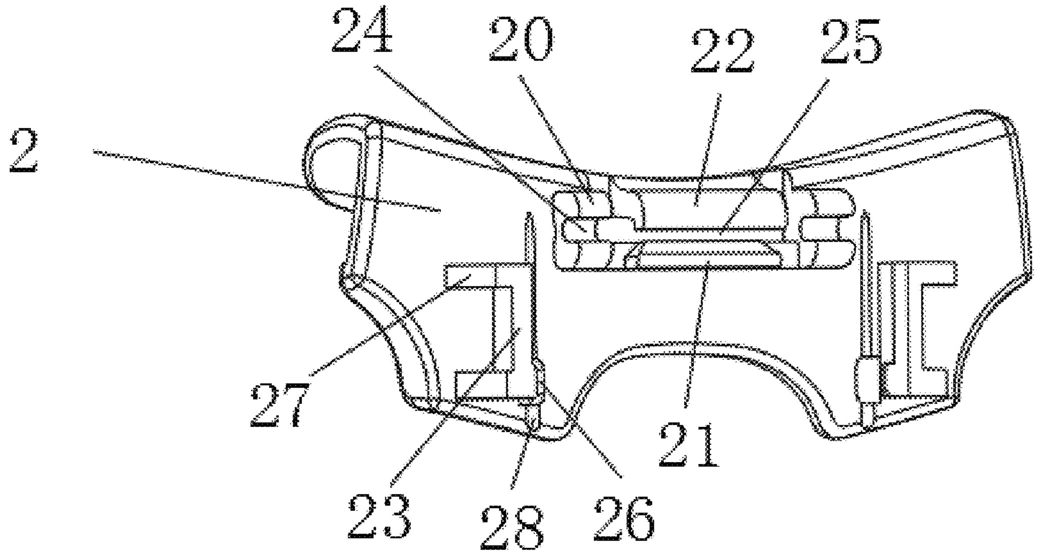
FIG. 3 is a structural diagram of the supporting blocks and cladding plate of the present disclosure.
Figure 4:
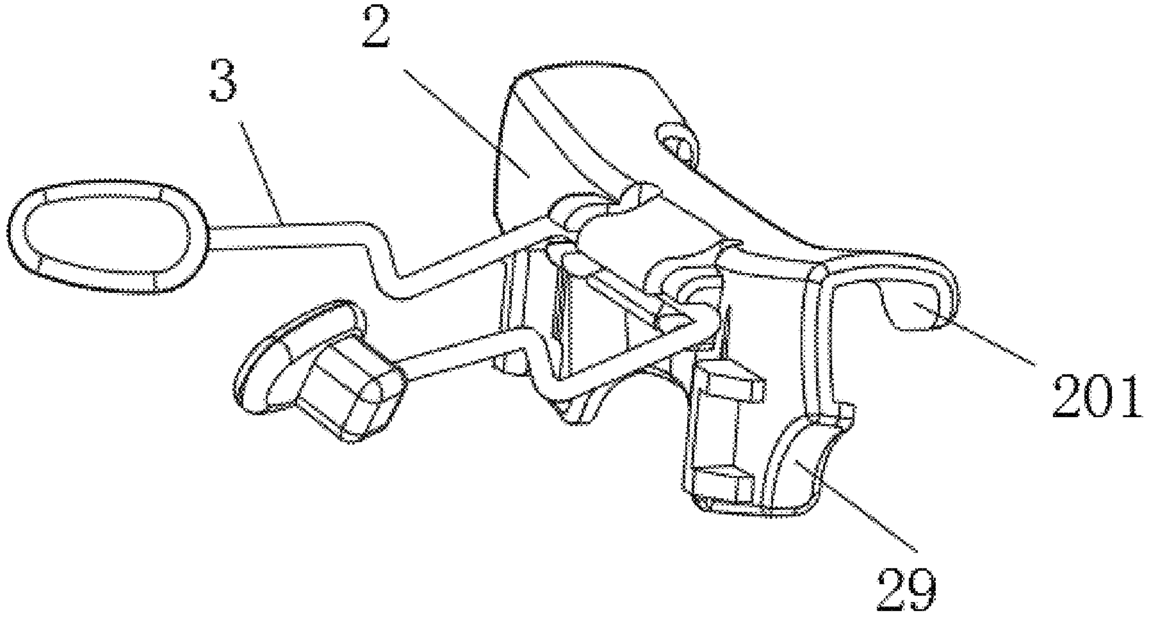
FIG. 4 is a structural diagram of the upper snap-fit portions and lower snap-fit portions of the present disclosure.
Figure 5:
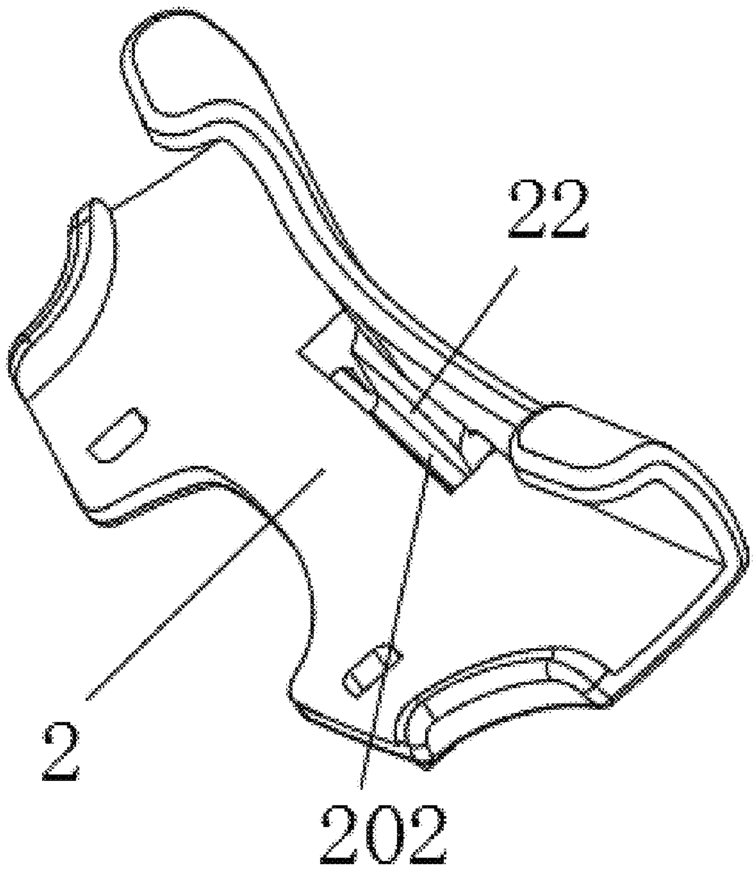
FIG. 5 is a structural diagram of the through slot and cladding plate of the present disclosure.
Figure 6:
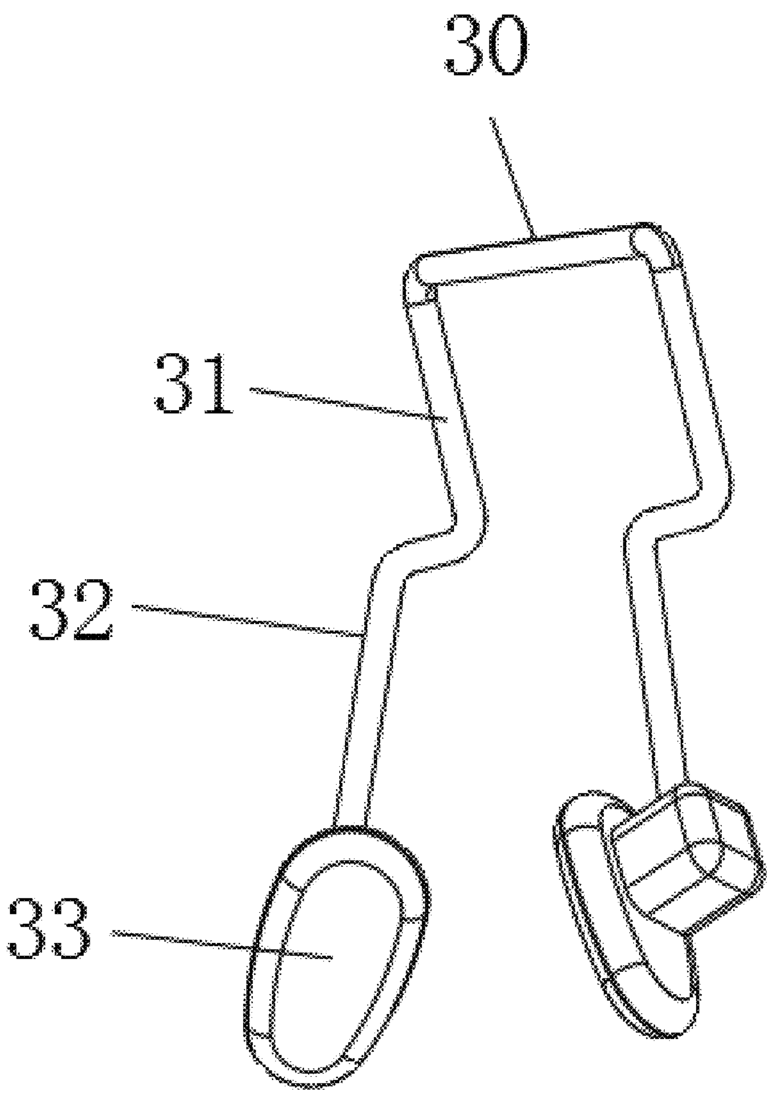
FIG. 6 is a structural diagram of the bracket and nose pad members of the present disclosure.

As shown in FIGS. 1 to 6, an embodiment of the present disclosure provides an eyeglass nose pad, comprising a connector 2 and a bracket 3;

In one embodiment, the bracket 3 is formed by integrally bending a metal wire, and comprises a horizontal rotating shaft 30, connecting arms 31 bent and extended at a 90-degree angle from both ends of the rotating shaft 30, and mounting arms 32 extended obliquely upward from the end of each of the connecting arms 31; the rotating shaft 30 is rotatably connected to the connector 2, and nose pad members 33 are mounted at the ends of the mounting arms 32. The rigidity of the metal wire ensures structural strength, and its bending property is utilized to form a specific spatial geometry. The oblique upward extension of the mounting arms 32 matches the natural inclination angle of the nose bridge, enabling the nose pad members 33 to fit more closely against both sides of the user's nasal bridge and improving stability;

The bracket 3 has a rotational stroke of 0 to 180 degrees relative to the connector 2, and the connector 2 is provided with a limiting structure for locking and positioning the connecting arms 31 when the bracket 3 rotates to one end of the stroke. The limiting structure comprises a pair of locking plates 23 symmetrically fixed to both sides of the bottom of the connector 2, and locking blocks 26 are fixedly connected to the mutually facing sides of the two locking plates 23;

when the bracket 3 rotates to a specific angle, the connecting arms 31 interfere with the locking blocks 26 and slide over or snap-fit into a predetermined position by means of the elastic deformation of the material;

When the bracket 3 rotates to the position of 0 degrees, the bracket 3 is formed by integrally bending an elastic metal wire. By pressing the two mounting arms 32 inward, the connecting arms 31 can undergo elastic deformation, allowing the connecting arms 31 to disengage from the constraint of the locking blocks 26 and lift upward, thereby unlocking the bracket 3 to enable its flipping. Accommodating slots 28 are provided in regions of the connector 2 corresponding to the positions where the connecting arms 31 are in a locked state; it provides a space for the connecting arms 31 to be partially embedded when locked, making the locking more secure and reducing the overall protrusion height in the locked state, resulting in a more compact structure.

In one embodiment, supporting blocks 20 are symmetrically and fixedly connected to both sides of the connector 2; arc-shaped rotating slots 24 are provided on the supporting blocks 20; a limiting baffle 21 is fixedly connected to the connector 2 between the two supporting blocks 20; the upper edge of the limiting baffle 21 is flush with the tangent line at the lowest point of the bottom of the rotating slots 24; and the rotating shaft 30 of the bracket 3 is accommodated in the two rotating slots 24. The rotating shaft 30 is supported within the rotating slots 24, and the supporting blocks 20 and rotating slots 24 provide a rotational axis and a supporting surface, ensuring smooth rotation;

A cladding plate 22 bent and extended toward the rotating shaft 30 is fixedly connected to the top of the connector 2 adjacent to the limiting baffle 21, and the bent portion of the cladding plate 22 semi-clads the upper part of the rotating shaft 30. This forms a cover over the rotating shaft 30 from above, further enhancing the tensile resistance of the rotational connection;

A guiding gap 25 is formed between the cladding plate 22 and the limiting baffle 21, with the width of the guiding gap 25 being smaller than that of the rotating slots 24, and a through slot 202 is provided on the side of the connector 2 corresponding to the guiding gap 25 facing the interior thereof. Reinforcing ribs 27 are provided on the sides of the two locking plates 23 facing away from each other; the through slot 202 provides clearance space for the rotating shaft 30 during its 180-degree flipping motion, so as to avoid structural interference; the reinforcing ribs 27 enhance the bending stiffness thereof.

An electronic eyeglass nose pad and an electronic eyeglass including the same, comprising an electronic eyeglass body 1, as well as a beam part 11 and a nose pad part 10 disposed on the electronic eyeglass body 1, wherein the connector 2 is detachably fixed between the beam part 11 and the nose pad part 10 via snap-fit structures disposed on the top and bottom thereof. By fixing the independent connector 2 to the electronic eyeglass body 1 in a multi-point snap-fit manner, quick assembly and disassembly of the nose pad members 33 are achieved, facilitating users to clean, maintain, or replace nose pad members 33 of different sizes or materials.

In one embodiment, the snap-fit structures include upper snap-fit portions 201 symmetrically disposed on both sides of the top of the connector 2 for snap-fitting with the beam part 11, and lower snap-fit portions 29 symmetrically disposed on both sides of the connector 2 for being snap-fitted into the gap between the nose pad part 10 and the beam part 11. By virtue of the elasticity of the connector 2, the upper snap-fit portions 201 are deformed to be snap-fitted under the beam part 11, and the lower snap-fit portions 29 are embedded into the structural gap to achieve lateral positioning.

In operation of the disclosure: First, by snap-fitting the upper snap-fit portions 201 on the top of the connector 2 into the beam part 11 of the electronic eyeglass, while embedding the lower snap-fit portions 29 on the bottom thereof into the gap between the nose pad part 10 and the beam part 11, quick and secure mounting of the entire nose pad on the eyeglass body can be achieved, allowing the entire nose pad assembly to be conveniently disassembled, facilitating users to thoroughly clean or replace the nose pad members 33 and the bracket 3. During wearing, users can manually flip the bracket 3, and its rotating shaft 30 rotates smoothly along the rotating slots 24 on the supporting blocks 20, with the cooperation of the cladding plate 22 and the limiting baffle 21 preventing detachment; when the bracket 3 is flipped to a service angle, such as 0 degrees, by pressing the two mounting arms 32 inward, the connecting arms 31 can undergo elastic deformation, allowing the connecting arms 31 to be embedded into the accommodating slots 28 and be securely locked by the locking blocks 26, thereby reliably locking the nose pad in the service position and ensuring wearing stability. After use, when placing the electronic eyeglass into the eyeglass case for charging, users can apply a torque again to disengage the connecting arms 31 from the locked position, and continue to flip the bracket 3 to any angle for storage.

The foregoing is merely a description of the specific embodiments of the present disclosure. However, the scope of protection of the present disclosure is not limited thereto. Any person skilled in the art may readily conceive of various changes or substitutions within the technical scope disclosed by the present disclosure, and these shall fall within the scope of protection of the present disclosure. Therefore, the scope of protection of the present disclosure shall be subject to the scope of protection defined by the appended claims.

What is claimed is:

1. An eyeglass nose pad, comprising a connector (2) and a bracket (3);

the bracket (3) is formed by integrally bending an elastic metal wire, and comprises a horizontal rotating shaft (30), two connecting arms (31) bent and extended at a 90-degree angle from both ends of the rotating shaft (30), and two mounting arms (32) extended obliquely upward from the end of each of the connecting arms (31); the rotating shaft (30) is rotatably connected to the connector (2), and nose pad members (33) are mounted at the ends of the mounting arms (32), wherein the connector (2) is provided with a limiting structure for locking and positioning the connecting arms (31), the limiting structure comprises a pair of locking plates (23) symmetrically fixed to both sides of the bottom of the connector (2), and a pair of locking blocks (26) are respectively fixedly connected to the mutually facing sides of the two locking plates (23), wherein the bracket (3) is configured to has a rotational stroke of 0 to 180 degrees relative to the limiting structure, and the limiting structure is configured and positioned to form snap-fit with the connecting arms (31) in the following way: as the bracket (3) rotates toward the limiting structure, the two connecting arms (31) respectively contact and interfere with the locking blocks (26), and slide over the locking blocks (26) by elastic deformation toward each other and then form snap-fit with the locking blocks (26) when the bracket (3) rotates to a position with an angle of 0 degree relative to the limiting structure, wherein by pressing the two mounting arms (32) toward each other so that the connecting arms (31) undergo elastic deformation toward each other, allowing the connecting arms (31) to disengage from the locking blocks (26) and move away from the locking blocks (26) along with the rotation of the bracket (3) toward a position with an angle of 180 degree relative to the limiting structure.

2. The eyeglass nose pad according to claim 1, wherein accommodating slots (28) are provided in regions of the connector (2) corresponding to the positions where the connecting arms (31) are in a locked state.

3. The eyeglass nose pad according to claim 1, wherein supporting blocks (20) are symmetrically and fixedly connected to both sides of the connector (2); arc-shaped rotating slots (24) are provided on the supporting blocks (20); a limiting baffle (21) is fixedly connected to the connector (2) between the two supporting blocks (20); the upper edge of the limiting baffle (21) is flush with the tangent line at the lowest point of the bottom of the rotating slots (24); and the rotating shaft (30) of the bracket (3) is accommodated in the two rotating slots (24).

4. The eyeglass nose pad according to claim 3, wherein a cladding plate (22) bent and extended toward the rotating shaft (30) is fixedly connected to the top of the connector (2) adjacent to the limiting baffle (21), and the bent portion of the cladding plate (22) semi-clads the upper part of the rotating shaft (30).

5. The eyeglass nose pad according to claim 4, wherein a guiding gap (25) is formed between the cladding plate (22) and the limiting baffle (21), with the width of the guiding gap (25) being smaller than that of the rotating slots (24), and a through slot (202) is provided on the side of the connector (2) corresponding to the guiding gap (25) facing the interior thereof.

6. The eyeglass nose pad according to claim 1, wherein reinforcing ribs (27) are provided on the sides of the two locking plates (23) facing away from each other.

7. An electronic eyeglass nose pad, comprising the eyeglass nose pad according to any one of claims 1-6, which is configured to be detachably mounted on an electronic eyeglass body (1), wherein a beam part (11) and a nose pad part (10) are disposed on the electronic eyeglass body (1), wherein the connector (2) is configured to have snap-fit structures disposed on the top and bottom thereof, so that the connector (2) is snap-fitted on the electronic eyeglass body (1) between the beam part (11) and the nose pad part (10) without additional connection mechanism.

8. The electronic eyeglass nose pad according to claim 7, wherein the snap-fit structures comprise upper snap-fit portions (201) symmetrically disposed on both sides of the top of the connector (2) for snap-fitting with the beam part (11), and lower snap-fit portions (29) symmetrically disposed on both sides of the connector (2) for being snap-fitted into the gap between the nose pad part (10) and the beam part (11).

9. An electronic eyeglass, comprising the electronic eyeglass nose pad according to claim 7.

* * * * *